(12) United States Patent
Murray

(10) Patent No.: US 9,016,774 B2
(45) Date of Patent: Apr. 28, 2015

(54) VEHICLE CHASSIS

(75) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 0 days.

(21) Appl. No.: 13/380,603

(22) PCT Filed: Jun. 25, 2010

(86) PCT No.: PCT/GB2010/001253
§ 371 (c)(1),
(2), (4) Date: Dec. 23, 2011

(87) PCT Pub. No.: WO2010/149981
PCT Pub. Date: Dec. 29, 2010

(65) Prior Publication Data
US 2012/0098300 A1 Apr. 26, 2012

(30) Foreign Application Priority Data
Jun. 25, 2009 (GB) .................................. 0911020.6

(51) Int. Cl.
*B62D 25/20* (2006.01)
*B62D 29/04* (2006.01)
(Continued)

(52) U.S. Cl.
CPC ............ *B62D 29/043* (2013.01); *B62D 23/005* (2013.01); *B62D 29/001* (2013.01); *B62D 29/005* (2013.01)

(58) Field of Classification Search
CPC ........ B62D 21/00; B62D 21/10; B62D 21/12; B62D 29/005

USPC .............................................. 296/203.01, 205
See application file for complete search history.

(56) References Cited

U.S. PATENT DOCUMENTS 2,113,075 A * 4/1938 Breer et al. ............... 296/203.01
2,269,451 A * 1/1942 Ford .............................. 296/205
(Continued)

FOREIGN PATENT DOCUMENTS

DE 19608127 A1 9/1997
DE 102006054002 A1 * 5/2008
(Continued)

OTHER PUBLICATIONS

Abstract only for DE 19608127, published Sep. 4, 1997. Drechsler, Klaus. Diamler-Benz.*
(Continued)

*Primary Examiner* — H Gutman
(74) *Attorney, Agent, or Firm* — Westman, Champlin & Koehler, P.A.; Z. Peter Sawicki; Amanda Prose

(57) ABSTRACT

A chassis for a vehicle is disclosed which combines rigidity, speed of manufacture, and a small environmental footprint. Such a chassis comprises a framework of Interconnected tubular sections (14, 18) and at least one composite sheet (50) bonded to the framework, at least part of the composite sheet being of unidirectional fibers. The sheet can be non-flat, and is preferably a concave geometry such as a tub. It can be composed of a plurality of sections (78, 80). The part of the composite sheet that Is of unidirectional fibers extends obliquely rearwardly from a tubular section on one side of the chassis toward a further tubular section on another side of the chassis, the fibers also being oriented obliquely rearwardly In the same sense. A further similar part extends in the opposite direction/symmetrically, overlapping as necessary.

15 Claims, 15 Drawing Sheets

(51) Int. Cl.
*B62D 23/00* (2006.01)
*B62D 29/00* (2006.01)

(56) References Cited

U.S. PATENT DOCUMENTS

| | | | |
|---|---|---|---|
| 4,217,970 A * | 8/1980 | Chika | 180/298 |
| 4,774,117 A * | 9/1988 | Oefner et al. | 428/71 |
| 5,704,644 A * | 1/1998 | Jaggi | 280/796 |
| 6,250,410 B1 * | 6/2001 | Balestrini et al. | 180/65.51 |
| 8,273,450 B2 * | 9/2012 | Green | 428/292.4 |
| 8,357,457 B2 * | 1/2013 | Green et al. | 428/532 |
| 8,490,920 B2 * | 7/2013 | Karem | 244/119 |
| 2004/0108705 A1 | 6/2004 | Witucki | |
| 2009/0104418 A1 * | 4/2009 | Ohki et al. | 428/213 |
| 2009/0121081 A1 * | 5/2009 | Karem | 244/119 |
| 2010/0000950 A1 * | 1/2010 | Malekmadani | 211/26 |
| 2010/0032081 A1 * | 2/2010 | Green | 156/219 |
| 2010/0035015 A1 * | 2/2010 | Green et al. | 428/106 |
| 2010/0035017 A1 * | 2/2010 | Green | 428/114 |
| 2010/0255251 A1 * | 10/2010 | Le Roy | 428/119 |
| 2013/0175104 A1 * | 7/2013 | Murray | 180/65.1 |
| 2013/0199097 A1 * | 8/2013 | Spindler et al. | 49/394 |

FOREIGN PATENT DOCUMENTS

| | | | |
|---|---|---|---|
| EP | 0361796 | A2 | 4/1990 |
| EP | 0594131 | A1 | 4/1994 |
| FR | 2687974 | A1 | 9/1993 |
| JP | 08318871 | A | 12/1996 |
| JP | 10045027 | A | 2/1998 |
| JP | H11500979 | A | 1/1999 |
| WO | 9627518 | A1 | 9/1996 |
| WO | 9803388 | A1 | 1/1998 |
| WO | 9944810 | A1 | 9/1999 |
| WO | 2008110814 | A2 | 9/2008 |
| WO | 2009122178 | A1 | 10/2009 |
| WO | WO 2009122178 | A1 * | 10/2009 |

OTHER PUBLICATIONS

Machine Translation of DE 10 2006 054 002A1, from Jun. 10, 2014.*
Japanese Office Action issued Mar. 25, 2014 for JP Application No. 2012-516852.
Extended European Search Report for Patent Application No. EP 14163078.0, issued Jul. 10, 2014.
UK Intellectual Property Office search report under Section 17(5) for GB0911020.6, Oct. 6, 2009.
Abstract of JP10045027A, Feb. 17, 1998
PCT International Search Report, Sep. 16, 2010.
PCT Written Opinion, Sep. 16, 2010.

* cited by examiner

VEHICLE CHASSIS

CROSS-REFERENCE TO RELATED APPLICATION

This application is a Section 371 National Stage Application of International Application No. PCT/GB2010/001253, filed Jun. 25, 2010 and published as WO 2010/149981 A1 on Dec. 29, 2010, the content of which is hereby incorporated by reference in its entirety.

FIELD

The present invention provides a vehicle chassis.

BACKGROUND

It hardly needs to be said that the chassis is a crucial component of a vehicle. It is the core of the vehicle, from which all other components are supported either directly or indirectly. It is ultimately responsible for absorbing and transmitting the forces experienced by the vehicle; its rigidity determines (to a large extent) the handling behaviour of the vehicle and its deformation behaviour is a major factor in the crashworthiness of the vehicle.

It is also the largest single component of the vehicle and (aside from the engine, in some cases) the heaviest. This means that the resources needed to construct the chassis and its eventual weight will be a significant part of the lifecycle environmental footprint of the vehicle.

Reduction of the weight and material requirements of the chassis will therefore lead to benefits in the performance, fuel economy and environmental footprint of the vehicle. However, this must be done without adversely affecting the necessary rigidity of the chassis.

Historically, a simple ladder chassis was constructed, using two longitudinal sections joined by crossmembers that (in effect) provided the "rungs" of the ladder. The longitudinal sections needed to be of a very large gauge in order to provide the necessary strength. This resulted in a chassis that, by today's standards, is too heavy and insufficiently rigid in torsion. It was, however, very straightforward to mass-produce.

The use of additional longitudinal sections joined by multiple crossmembers or bulkheads creates what is usually referred to as a tubular frame chassis. For mass-produced vehicles, these have however been dismissed as the time required for manufacture is generally too great.

Whilst the rigidity of such a structure is greater than that of a ladder chassis, in order to provide sufficient rigidity it is generally necessary to add additional diagonal members to the structure so that torsional moments are avoided and all forces are taken up by way of longitudinal tension or compression of a frame member. A structure of this type is usually referred to as a space frame, and is far too complex for mass production.

Modern volume-produced vehicles therefore universally use a pressed steel chassis. The chassis is formed by a pressing/stamping operation involving one or more steps. This produces a steel chassis which has the necessary rigidity but which is very heavy and requires very substantial tooling for its production. The remaining necessary parts of the vehicle structure are then spot-welded to the assembly.

The tools required to form the chassis are physically large, and must therefore be housed in a large facility. A substantial material cost (with attendant environmental footprint) is therefore involved in the chassis, the tools and the facility, the weight of the resulting chassis imposes a substantial ongoing environmental footprint as a result of the consequential energy requirements of the vehicle, and the large facility imposes a corresponding ongoing environmental footprint in terms of its heating, its lighting, its maintenance and so on. The necessary spot-welding involves significant energy consumption.

Our application WO2009/122178 described a chassis based on a steel framework complemented by a sheet or sheets bonded thereto. That application suggested the use of composite sheets. The content of that application is hereby incorporated by reference, and the attention of the skilled reader is specifically directed to that application for a fuller understanding of the present invention.

SUMMARY

The present invention seeks to provide a chassis for a vehicle which combines the necessary rigidity with sufficient speed of manufacture to permit volume production, but with an environmental footprint that is a fraction of that of a conventional pressed steel chassis. This application goes beyond the disclosure of WO2009/122178 and sets out preferred orientations of fibre re-enforcement in the composite sheets.

We therefore propose a chassis for a vehicle, comprising a framework of interconnected tubular sections and at least one composite sheet bonded to the framework, at least part of the composite sheet being of unidirectional fibres. Through the use of modern constructional methods such as laser cutting, CNC bending, and computer-controlled welding, the production time required for such a chassis can be kept to within a target of 120 seconds. Meanwhile, the composite sheet bonded to the framework acts as a structural part of the chassis and adds rigidity to the structure as a whole that enables it to meet the required degree of stiffness.

Such a chassis also has an exceptionally low carbon footprint. The use of (preferably hollow) tubular sections, which can be of a metallic material such as steel or Aluminium, is very much more economical in material usage than a pressed steel chassis and can be formed with significantly smaller tools which therefore (themselves) have a smaller footprint. The physical space required to construct such a chassis is also very much smaller, allowing a reduction in the heating, lighting, constructional and other costs and carbon footprint of the facility in which they are built.

Various composite materials are suitable, including carbon fibre composite, Kevlar fibre composite, glass fibre composite, and other composite materials such as metal matrix composites.

Composite skin materials can be supplied in various forms, such as random orientation, woven or uni-directional fibres which are then processed with thermo-setting or thermoplastic resins to provide a fibre carrier matrix to transmit shear forces from one fibre to another. The present further development of our manufacturing process combines, in its preferred embodiments, random orientated skins on large panels together with pre-cured and co-bonded low cost uni-directional members in specific locations. The combination of the random skins with the uni-directional members eliminates the requirement of expensive woven or uni-directional skins over large areas; the system has the advantage that it can carry highly concentrated loads that are applied to areas of the chassis frame/composite panel junction—this results in significant cost reductions of raw materials and manufacturing processing.

The sheet can be non-flat, and is preferably so since this will allow a greater degree of rigidity in a wider variety of axes. A concave geometry such as a tub is preferred. It can be composed of a plurality of sections, ideally joined by a method allowing a positional tolerance so that any tolerance in the construction of the framework can be accommodated.

The part of the composite sheet that is of unidirectional fibres preferably extends obliquely rearwardly from one side of the chassis toward another side, the fibres also being oriented obliquely rearwardly in the same sense. It can extend from a tubular section on one side of the chassis, and can extend to a further tubular section on another side of the chassis. A further similar part can extend in the opposite direction, preferably symmetrically, overlapping as necessary.

The chassis defined above can of course accept an engine and other running gear, bodywork and interior fittings which will be mounted at a suitable location on or under the chassis.

The present invention further provides a vehicle comprising a chassis as defined above. Where the vehicle assembly takes place remote from the chassis construction, the chassis as defined above can be transported very much more economically due to the very high degree of rigidity that is derived notwithstanding the largely planar shape. This compact shape for the chassis that is permitted by the present invention allows a large number of chassis elements (such as 6-8) to be fitted within a single standard shipping container. Thus, the transport costs and associated environmental footprint can be significantly reduced.

The tubes can be cut by a laser cutting process, and are preferably cut and profiled in the same step. They can be bent via a CNC bending process and joined via automatic welding.

BRIEF DESCRIPTION OF THE DRAWINGS

An embodiment of the present invention will now be described by way of example, with reference to the accompanying figures in which;

FIGS. 9 to 12 show perspective, plan, side and front views respectively of the sheet prior to fitting to the tubular frame;

DETAILED DESCRIPTION OF ILLUSTRATIVE EMBODIMENTS

Figure 1:
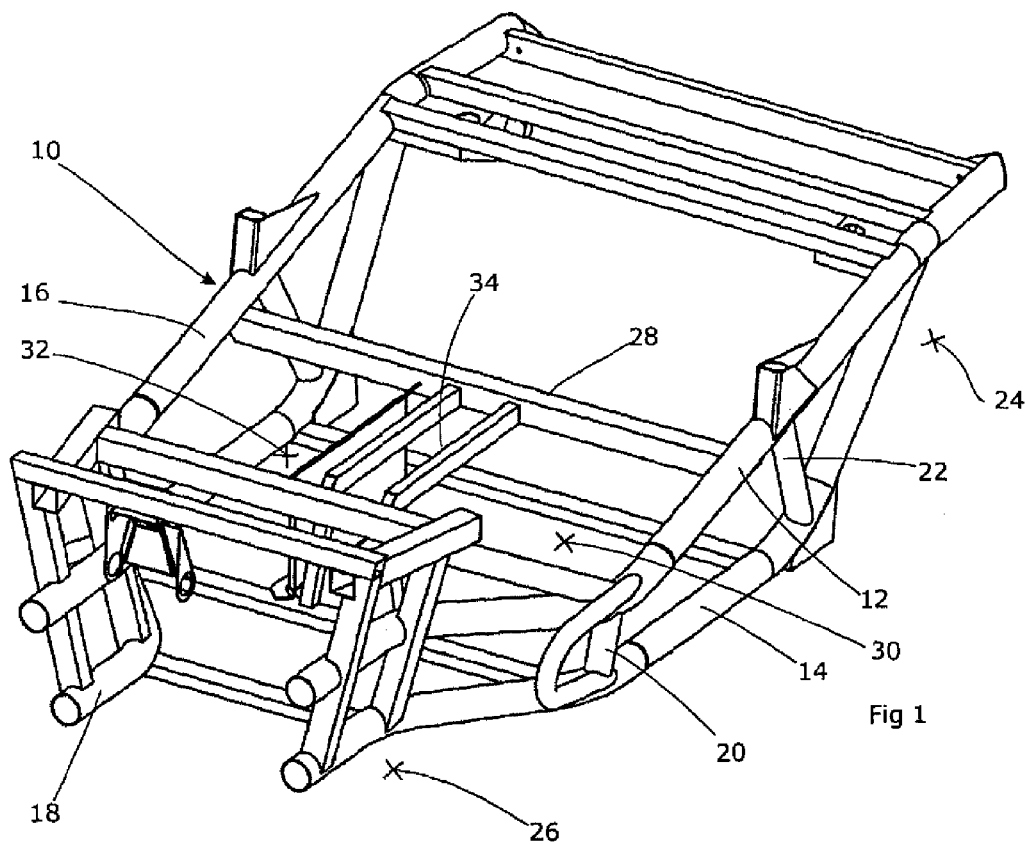
FIGS. 1 to 4 show perspective, plan, side and front views respectively of the tubular frame prior to fitting the sheet.
Figure 4:
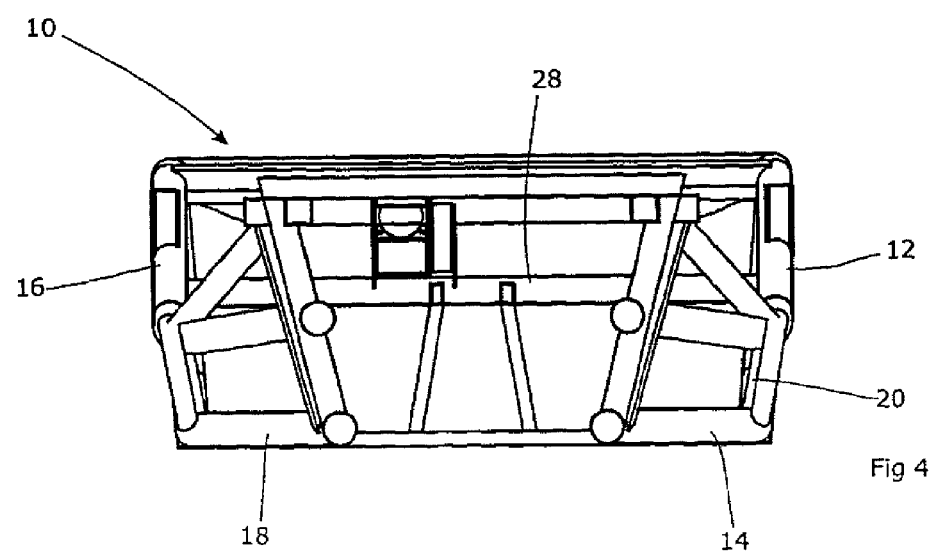

FIGS. 1, 2, 3 and 4 show a tubular frame construction used in the manufacture of vehicle chassis according to the present invention. The frame structure 10 comprises a series of 4 longitudinal members, two members 12, 14 on a left hand side of the vehicle and two members 16, 18 on a right hand side of the vehicle. The members on each respective side are connected via various riser elements 20, 22 and by the lower longitudinal member 14, 18 of the two rising towards the rear of the car so as to meet the corresponding upper member 12, 16. This rising profile also creates a space 24 at the rear of the car to accommodate the rear running gear. Likewise, at the front of the car all four longitudinal members include bends so as to divert them inwardly towards the centre line of the car and create a space 26 for the front running gear.

To hold the longitudinal members 12, 14, 16, 18 at the correct spacing, cross members such as that shown at 28 are provided, attached to the longitudinal members and extending transversely across the vehicle. Thus, a tubular frame structure is obtained, made up of a number of circular-section tubes.

These tubes are large diameter steel (or aluminium) thin wall tube which is cut and bent by CNC (computer numeric control) processes. The ends of the tube can currently be profiled by CNC laser apparatus followed by CNC bending and robotic welding. As a result, the steel structure of the chassis can be built up from sections of tubing, which are themselves obtained from elongate narrow steel strip. That is intrinsically straightforward to produce, bend and weld into a steel tube form, as opposed to a conventional pressed steel chassis which requires a single large steel billet to be forged into the necessary shape. The wastage of material and the energy required to form and assemble the tubular frame is therefore very much less than the equivalent steel pressing.

The multi-tubular structure created in this way is largely self-jigging, therefore requiring minimal additional parts for construction. Once the structure has been welded together, external and internal protection for the exposed steel can be applied via a suitable chemical bath.

The chassis illustrated herein by way of example is intended for use in relation to a three-seater personal transport vehicle as illustrated in (for example) our earlier patent application WO2008/110814. Accordingly, the structure provides footwell areas 30, 32 for the two rear passengers and a seating area 34 for the centrally positioned driver. However, other vehicle designs and layouts could be catered for in the design.

Figure 2:
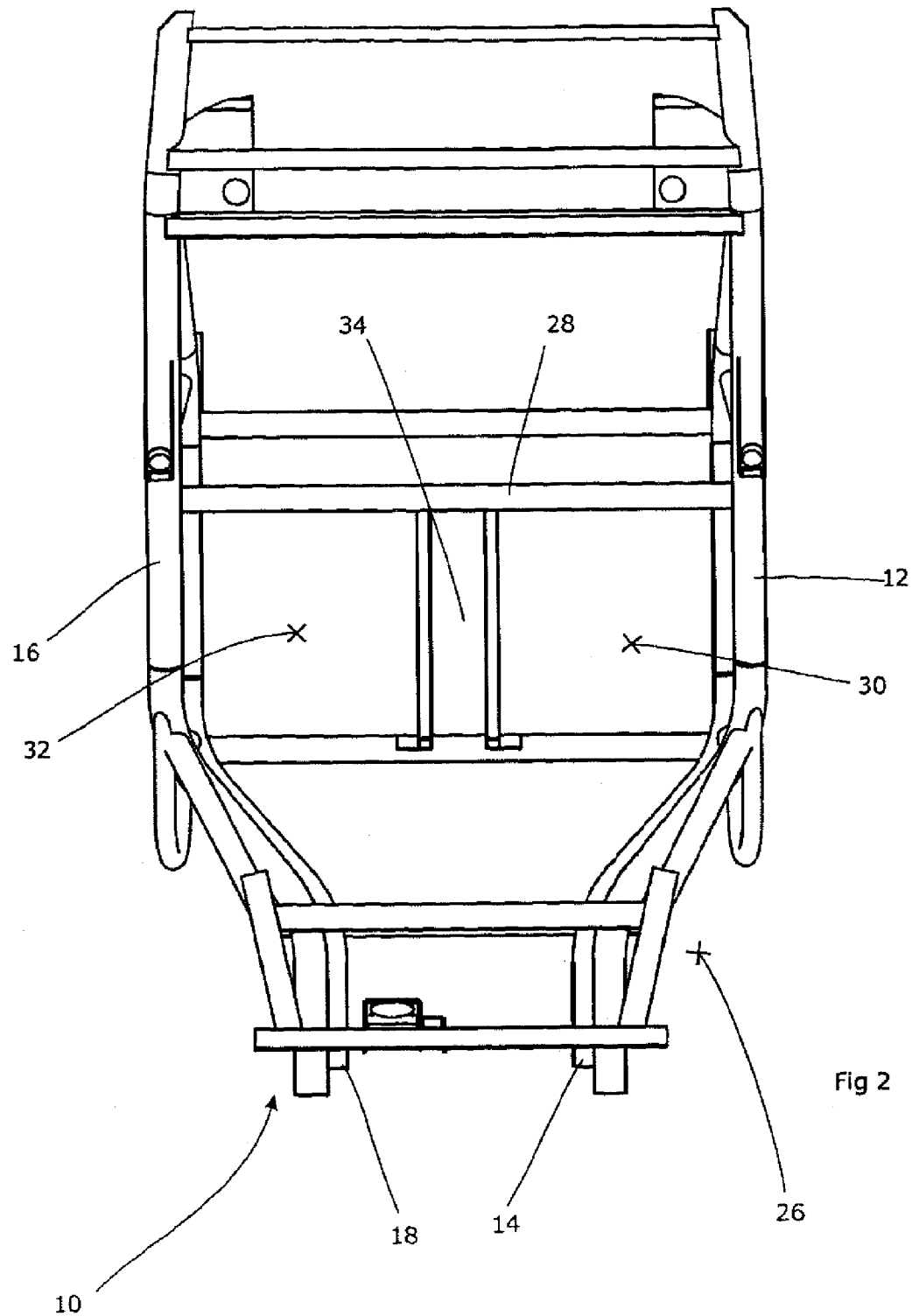
Figure 3:
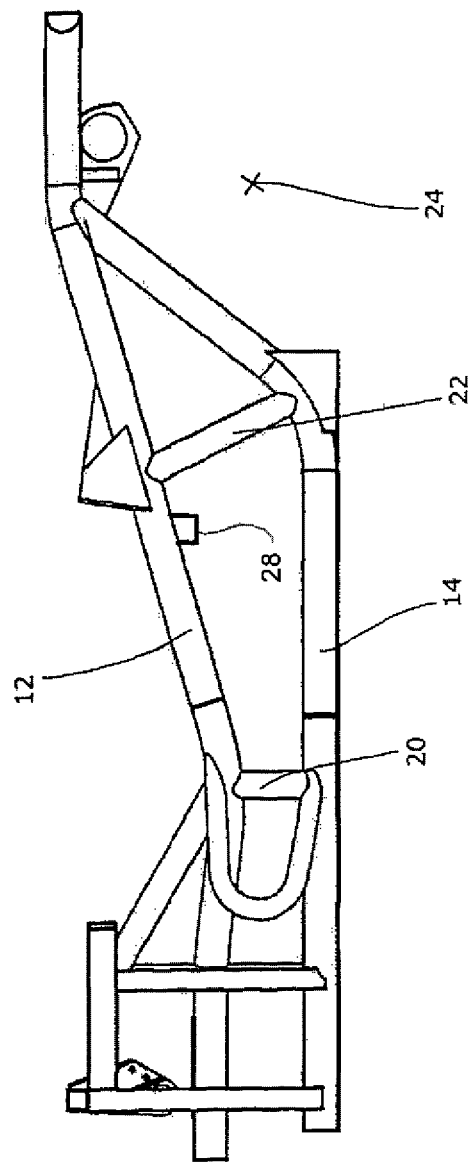
Figure 5:
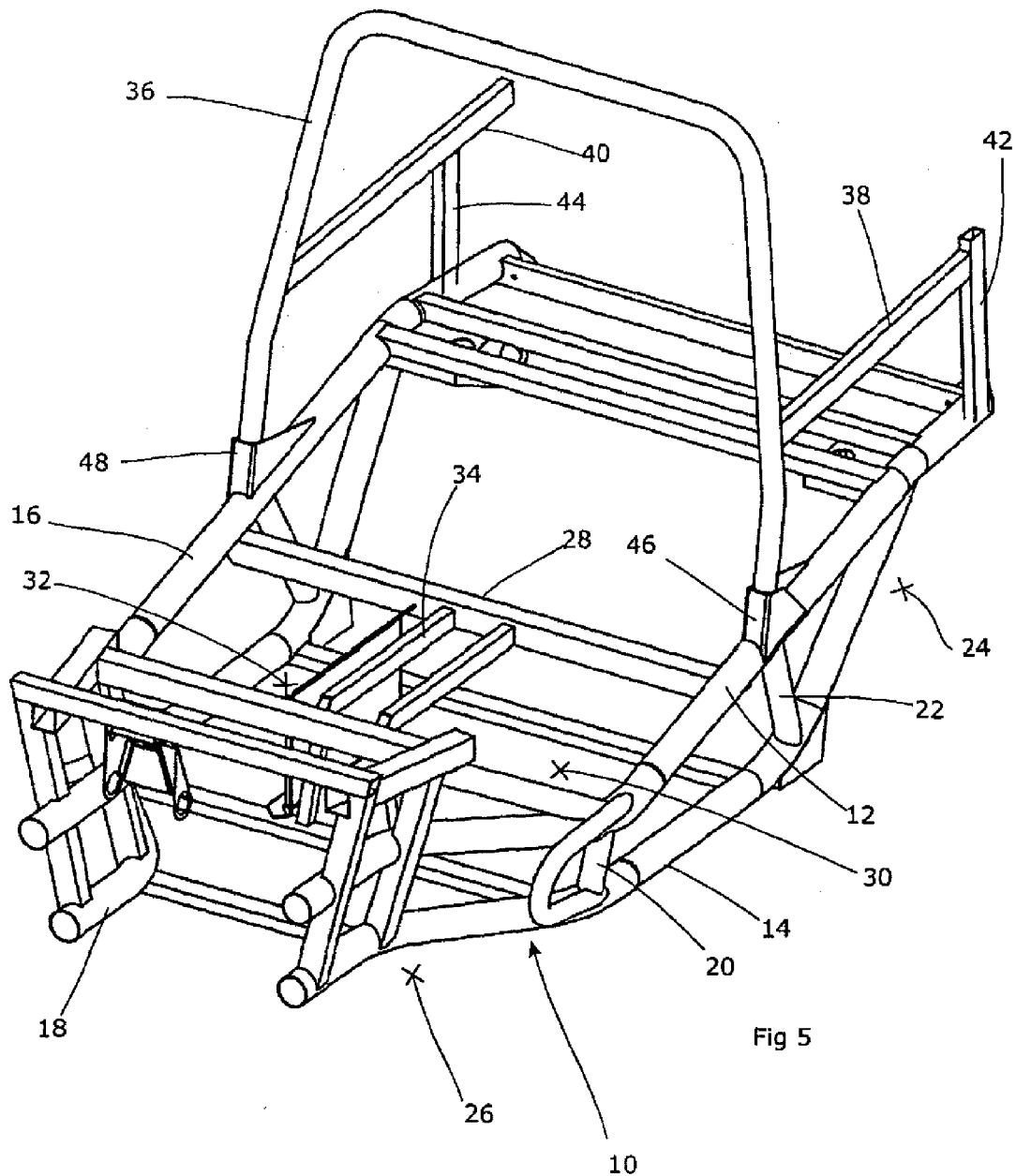
FIGS. 5 to 8 show perspective, plan, side and front views respectively of the tubular frame prior to fitting the sheet, with a roll bar fitted.
Figure 6:
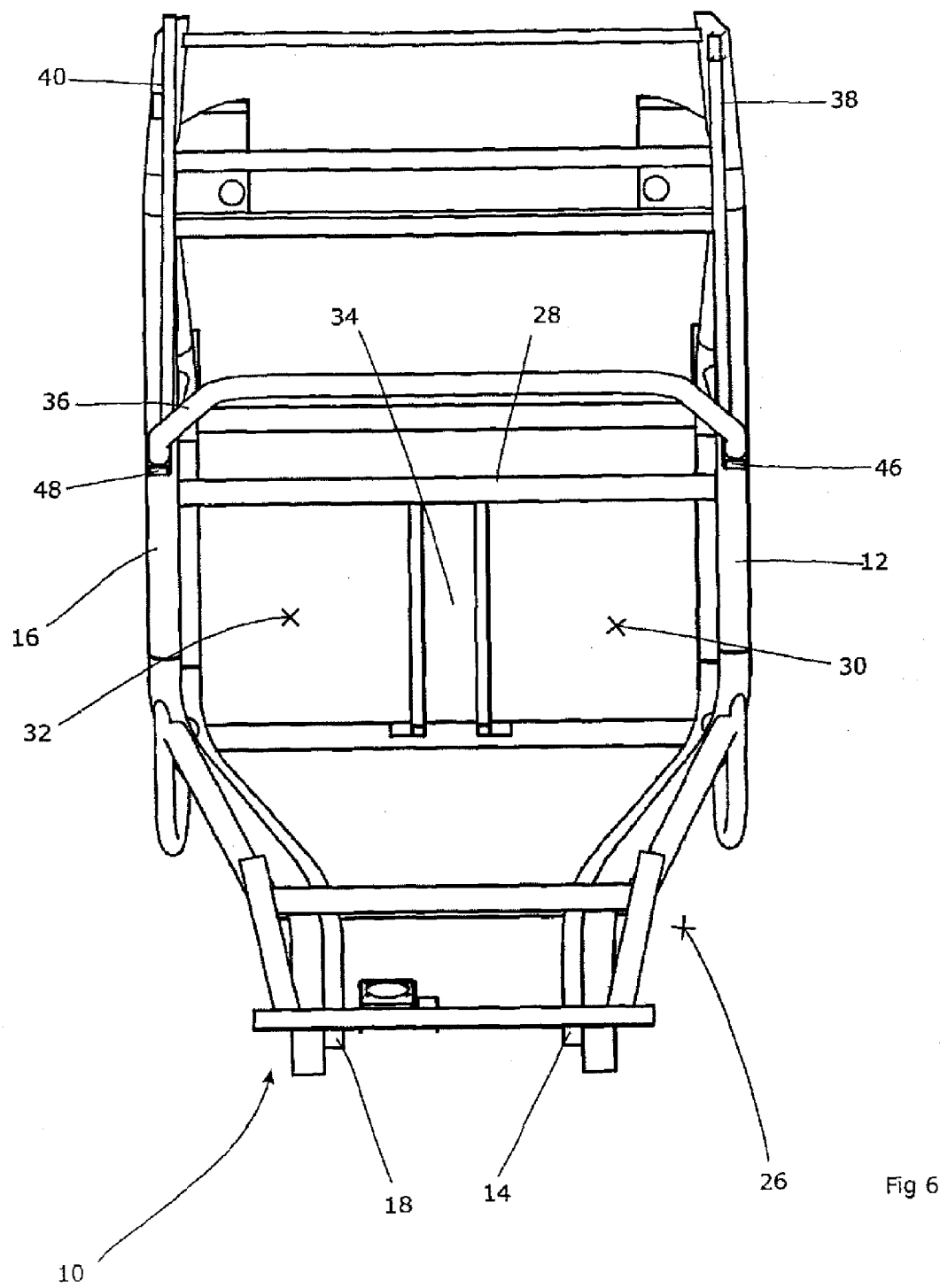
Figure 7:
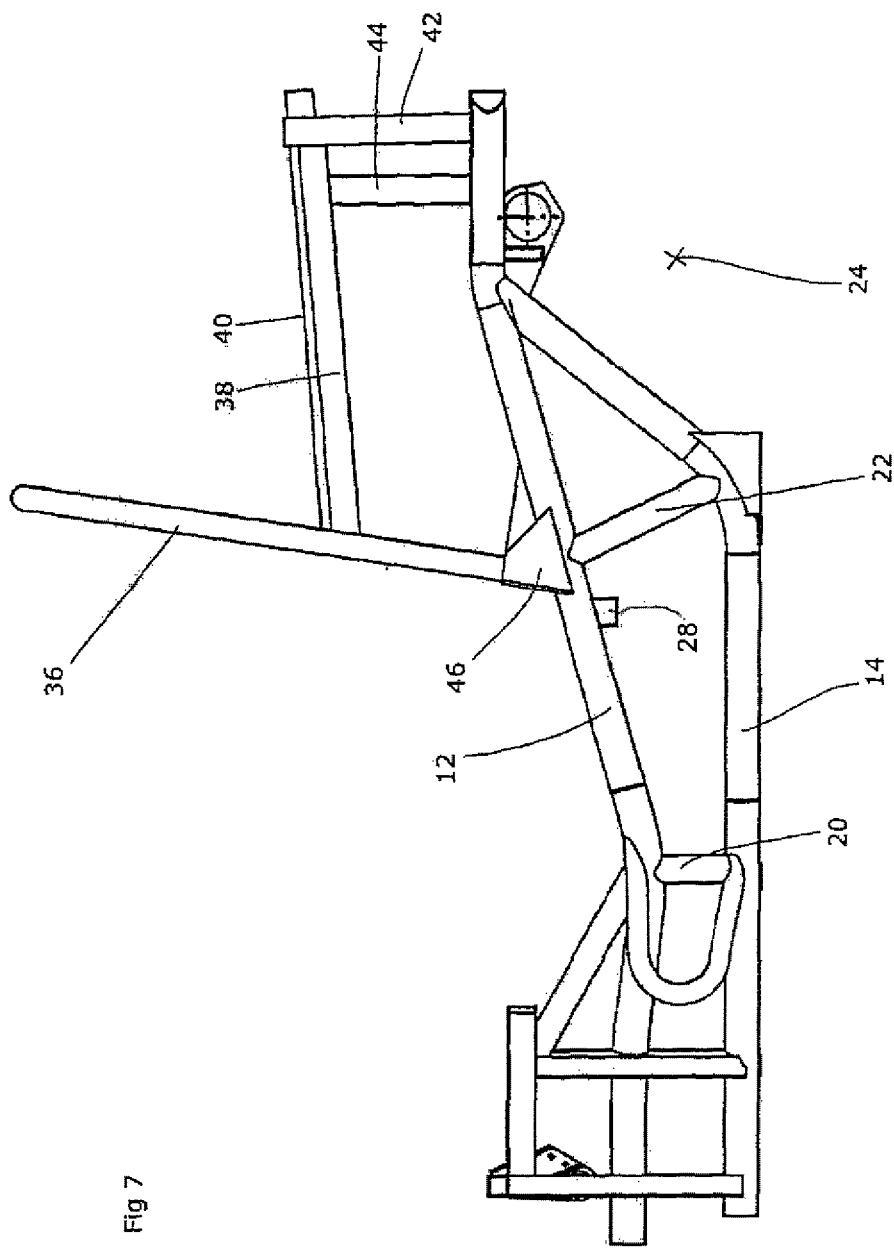
Figure 8:
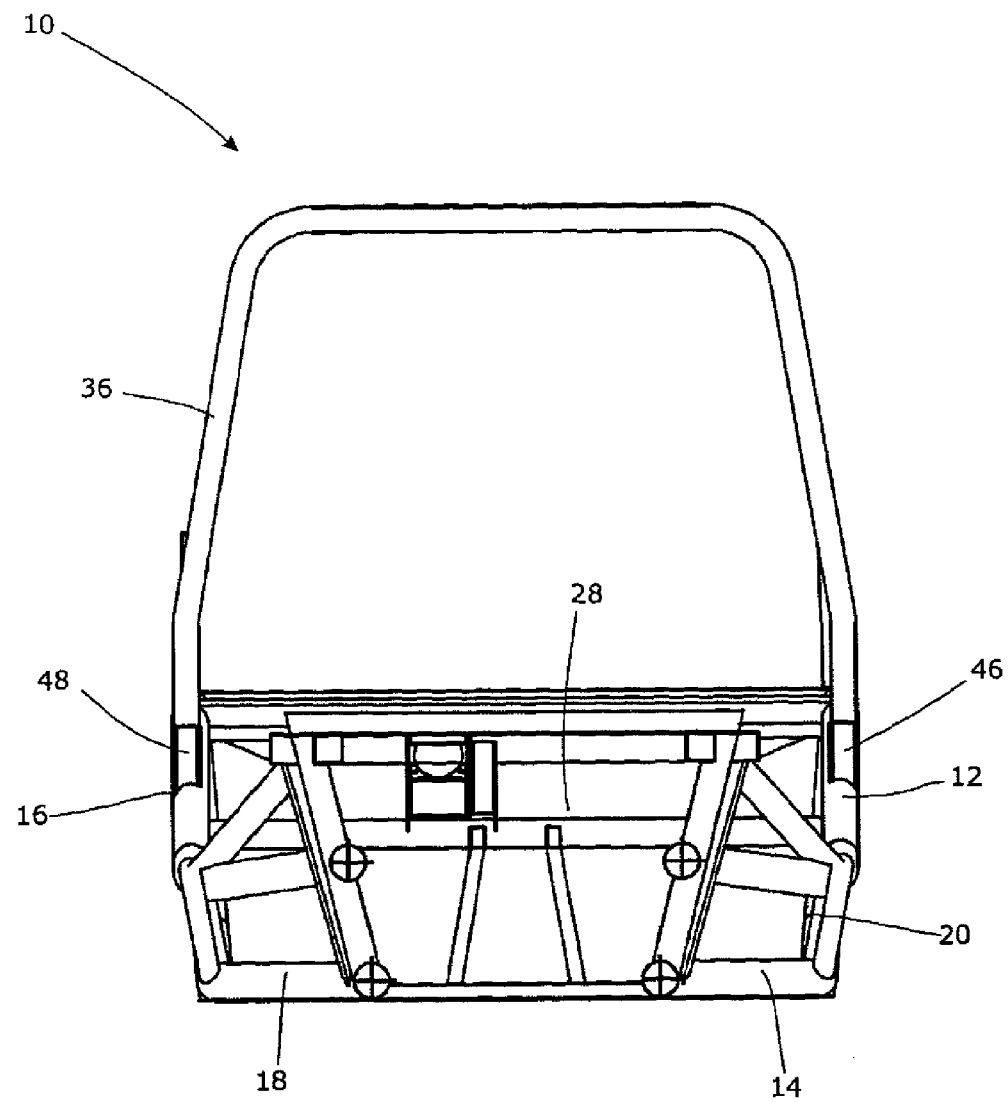
Figure 9:
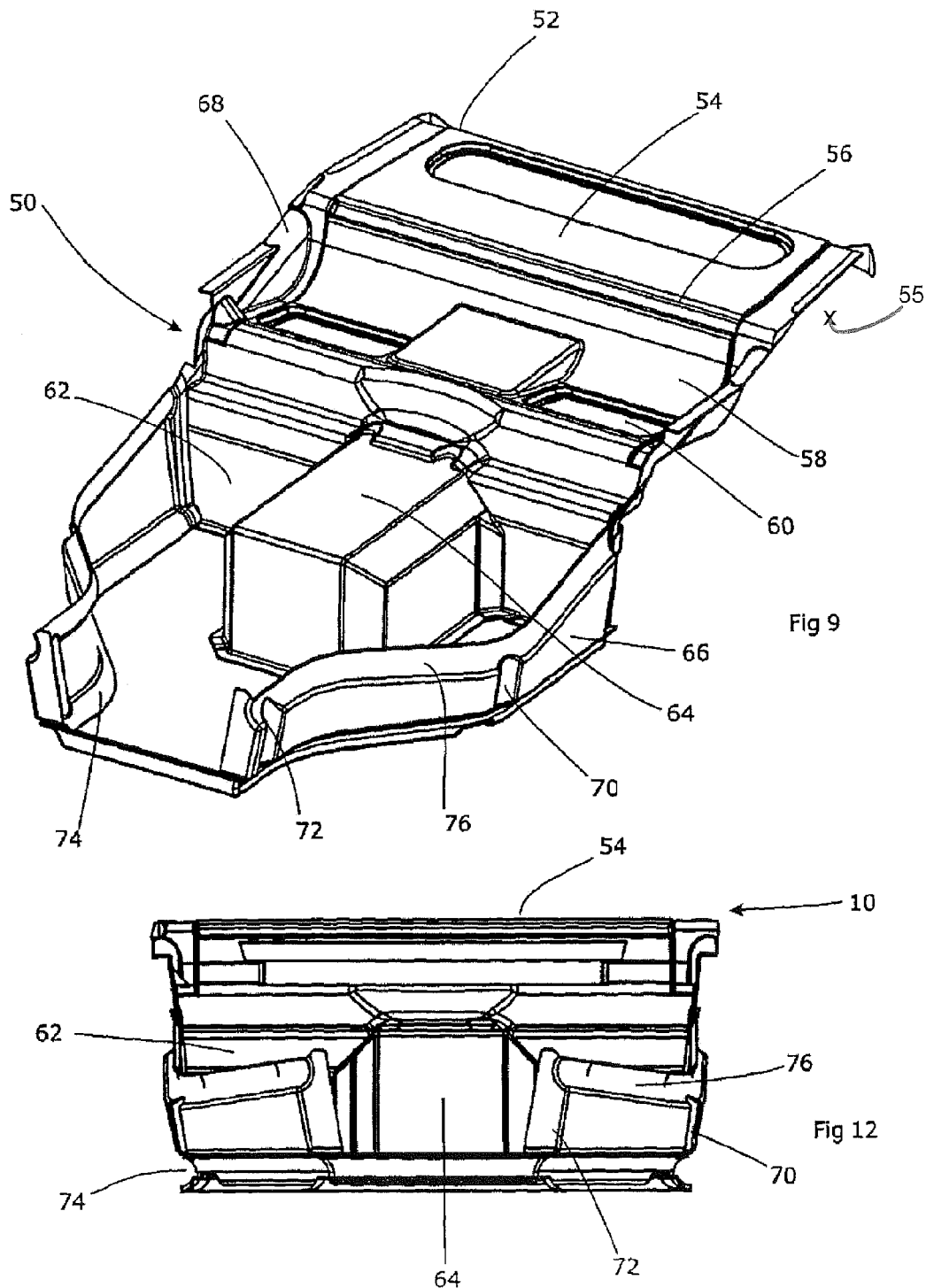
Figure 10:
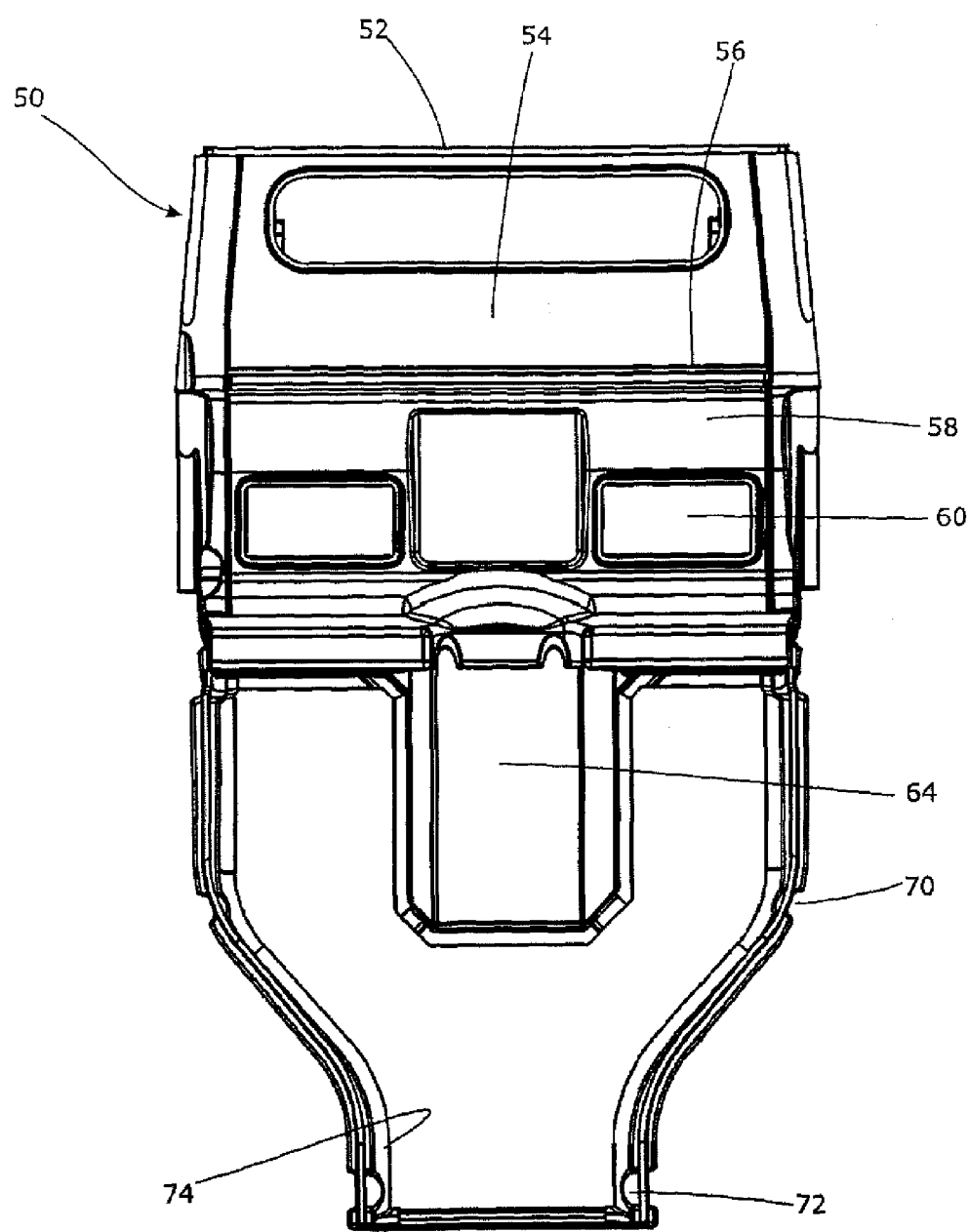
Figure 11:
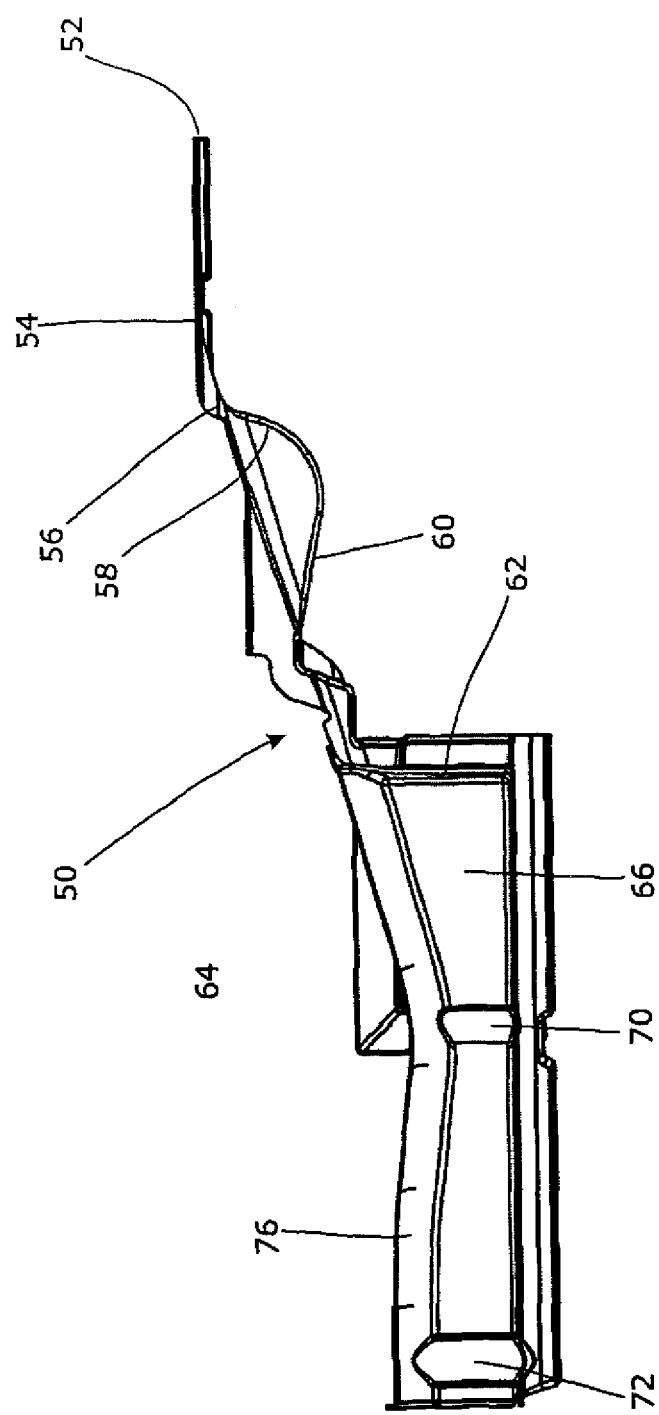
Figure 13:
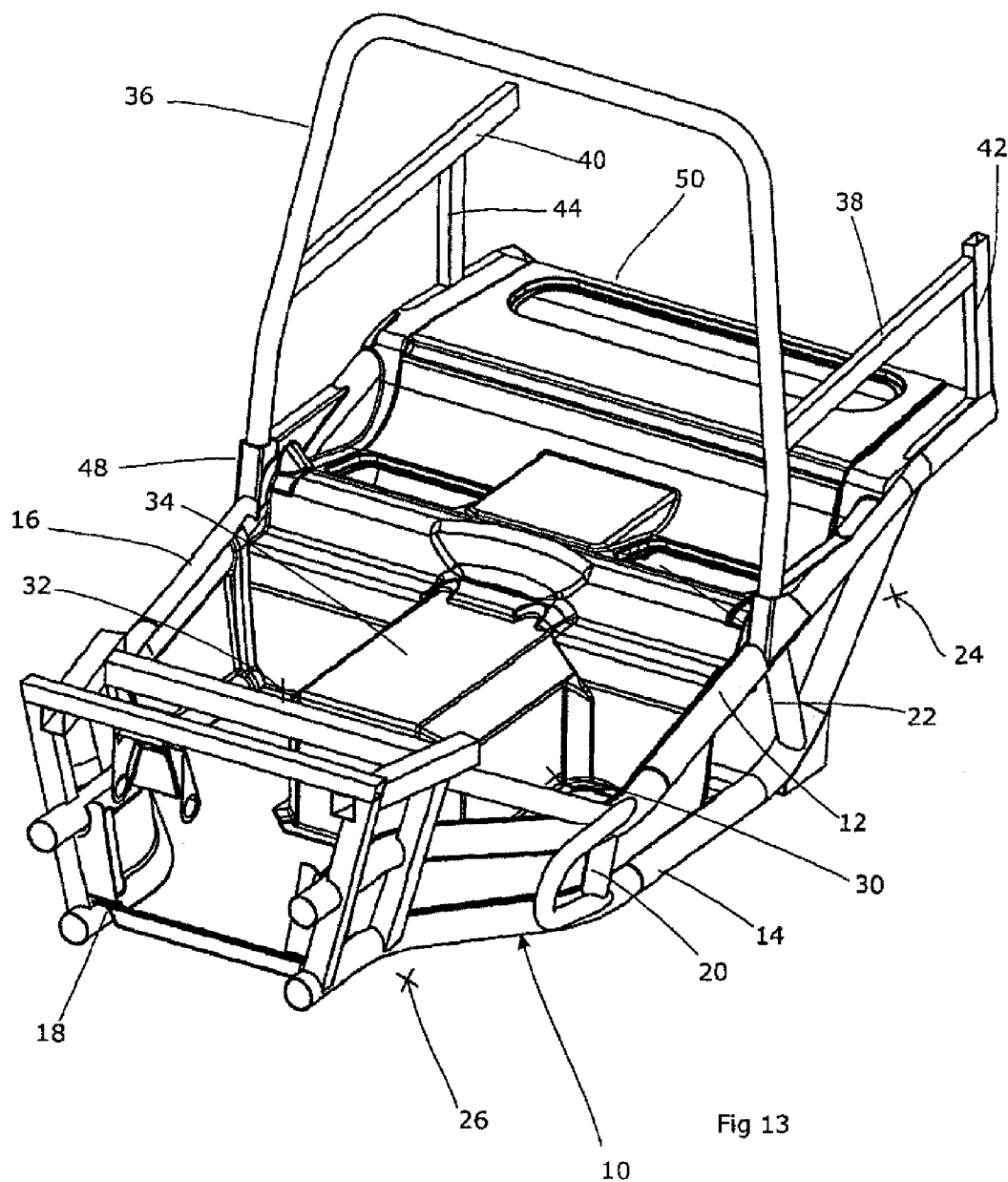
FIGS. 13 to 16 show perspective, plan, side and front views respectively of the tubular frame fitted with the sheet.
Figure 14:
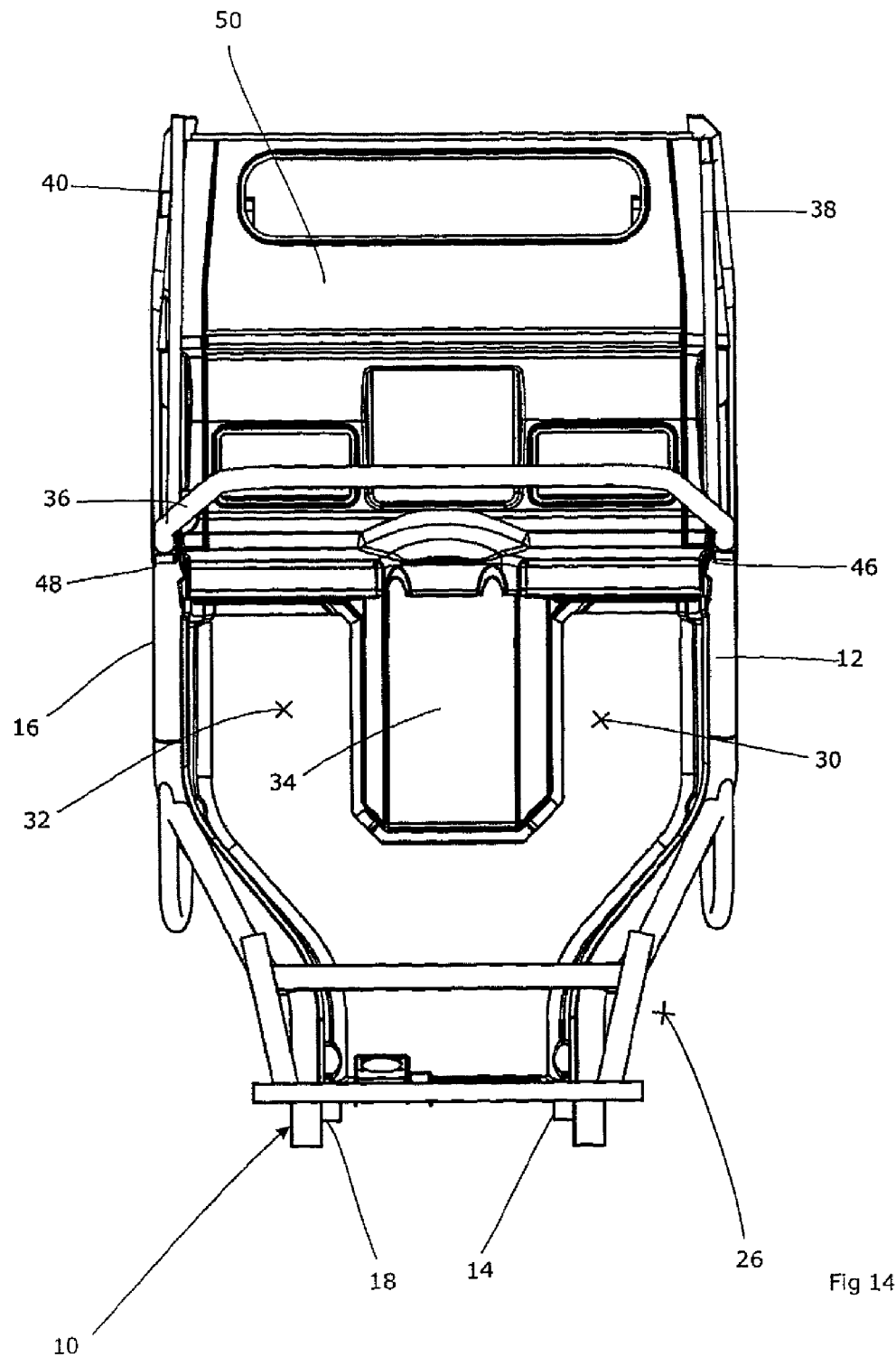
Figure 15:
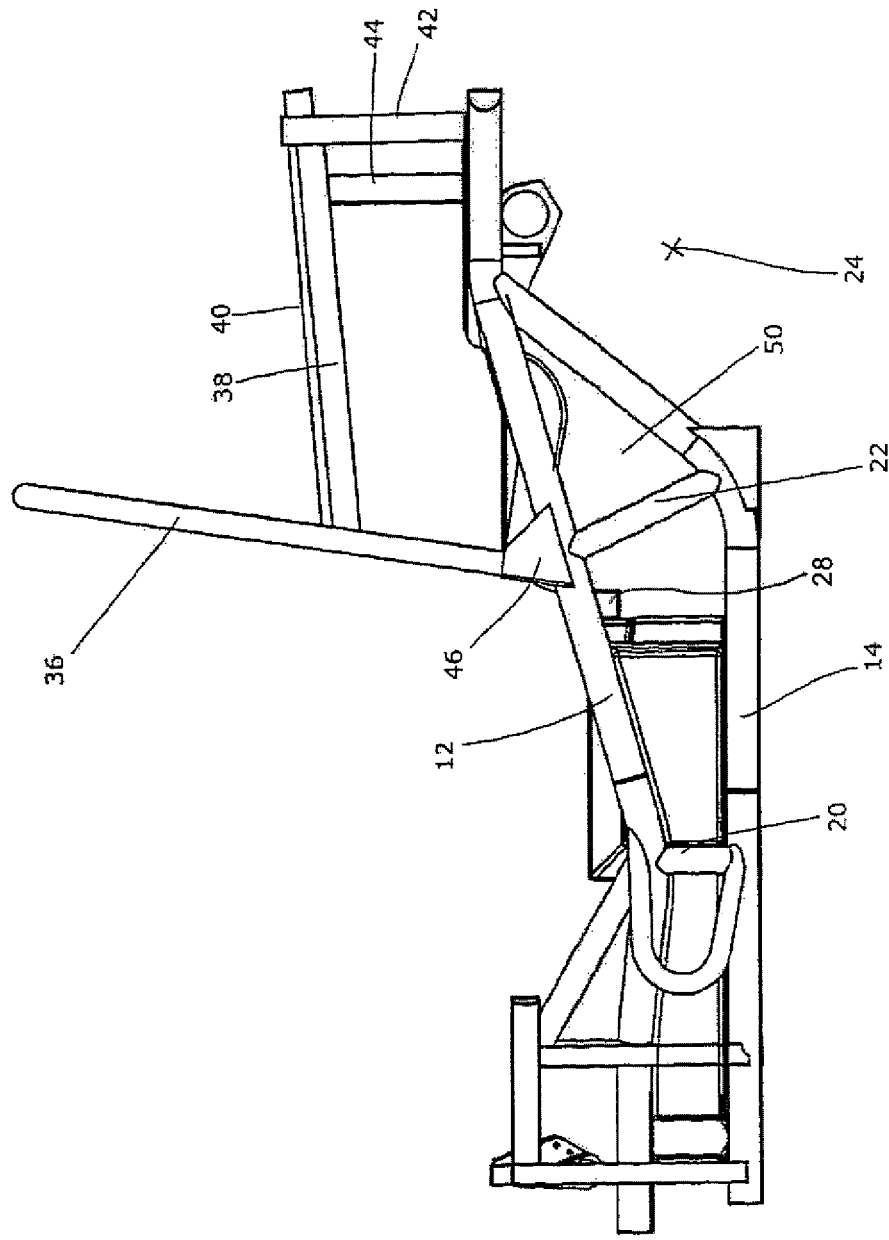
Figure 16:
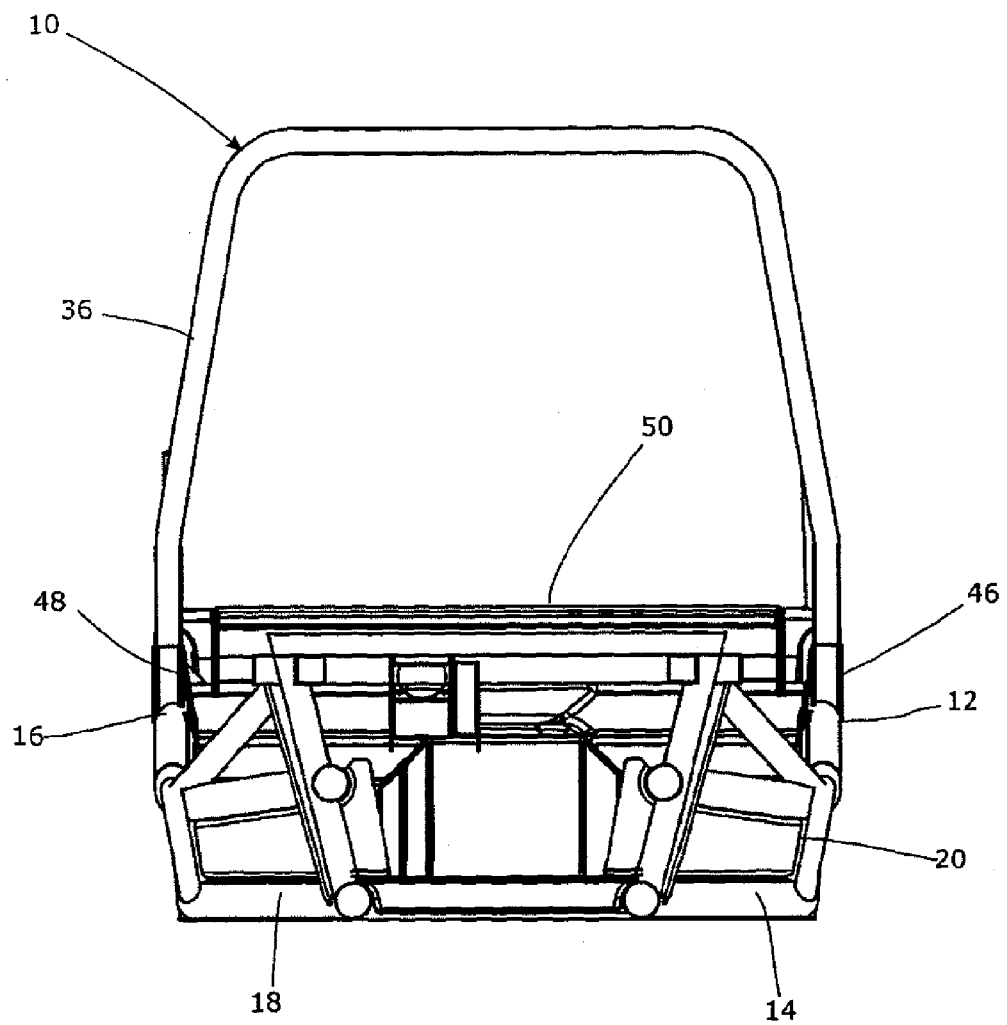

FIGS. 1-3 show an initial state of the construction in which the lower half of the vehicle chassis is provided, offering the basic elements of a load path that offers predictable crash management, greater rigidity and bending stiffness. However, even when compared to the final dimensions of this vehicle, the resulting chassis is extremely compact and it can be packaged into a standard shipping container (without side walls or a roof section attached) with very much greater efficiency than a conventional pressed steel and spot-welded chassis. This means that the chassis and body can be manufactured on separate sites with assembly taking place at either site or a third site, and also means that very many more chassis can be transported in a standard shipping container relative to a standard small car, thereby reducing shipping costs and the $CO^2$ emissions associated therewith. This is made possible by the multi-tubular structure, assembly of which can be suspended at an intermediate but stable state such as that shown in FIGS. 1-4, as opposed to a pressed steel structure.

FIGS. 5-8 show the multi-tubular structure 10 in FIGS. 1-4 to which a steel roll hoop 36 has been added. A pair of upper longitudinal members 38, 40 extend rearwardly from the roll hoop 36 and thus supported by struts 42, 44. The roll hoop 36 is accommodated within a pair of sockets 46, 48 that had previously been welded onto the longitudinal members 12, 16; this offers a secure location for the roll hoop 36. Side members 38, 40 extend rearwardly from the roll hoop and provide a means of mounting the rear body panels. To this complete tubular frame structure, a rigid sheet 50 is then added, this being shown in FIGS. 9-14.

The rigid composite sheet 50 has two main purposes. One is to reinforce the multi-tubular structure by transmitting loads between the tubular members, thereby increasing the rigidity of the structure as a whole and improving its crashworthiness. As noted above, various composite materials are suitable including carbon fibre composite, Kevlar fibre composite, glass fibre composite, and other composite materials such as metal matrix composites.

In support of its reinforcement task, the sheet is also formed into a non-flat shape so that it can offer rigidity against torsion. A flat sheet obviously only offers a high torsional rigidity about one axis, whereas a sheet with compound bends (i.e. bends in more than one non-parallel axis) can offer rigidity in substantially all dimensions.

The secondary purpose of the composite sheet 50 is to provide an internal structure to the vehicle, covering the apertures between tubular members. Thus, the sheet is moulded according to a compound shape that is convenient for the intended layout of the vehicle. Starting from the rear 52 of the vehicle, there is a flat panel 54 which acts as a parcel shelf or (in this case) as the floor of a load area over a rear-mounted engine compartment 55, then a downward curve 56 to provide an inclined seat backrest 58 for the rear seat passengers. After curving upwards again to provide the rear seat squabs 60, the outer parts of the sheet 50 then curve downward to provide the footwells 62 for the rear seat passengers. A central part extends forward as a ridge formation 64 to support a centrally mounted driver's seat; this, together with upright side panels 66 either side of the footwell 62 and side panels 68 either side of the rear seats 58 provides a three-dimensional compound curvature to the sheet 50.

Recesses are formed in the sheet 50 at locations 70, 72, 74, 76 that correspond to tubular sections in the framework 10. These allow the sheet 50 to follow and conform to the shape of parts of the framework 10 and be bonded to it, for example via a suitable engineering adhesive such as an epoxy resin. This permits forces to be transferred between the framework 10 and the sheet 50, thereby allowing the sheet 50 to contribute to the rigidity and crashworthiness of the chassis.

FIGS. 13 to 16 show the composite sheet 50 installed in and bonded to the framework 10 to form the complete chassis, to which the roll hoop 36 has been attached. The recesses 70, 72, 74, 76 in the sheet 50 now curve around a tube of the framework 10 and have been bonded to the relevant tube so that the sheet 50 and framework 10 form a single loadbearing structure to which the engine, running gear, internal and external trim etc can be fitted.

Figure 17:
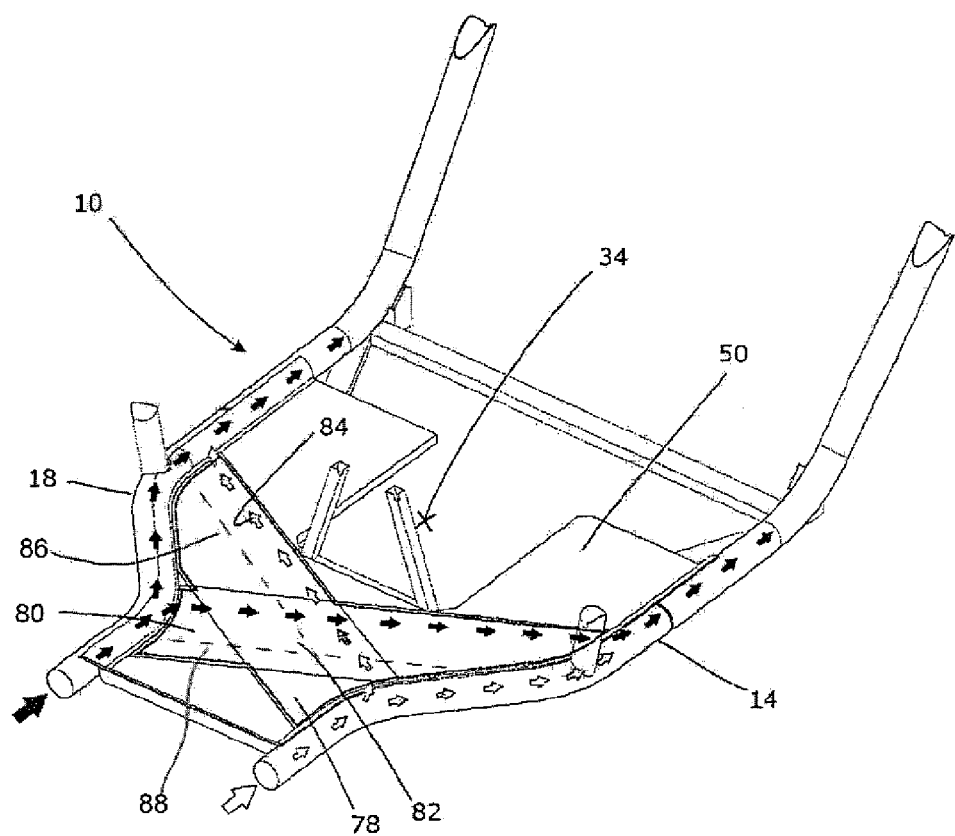
FIG. 17 illustrates the fibre orientation.

FIG. 17 shows the arrangement of fibre directions within the composite sheet 50. For clarity, much of the chassis illustrated in the preceding figures is omitted, leaving the lower longitudinal members 14, 18 and the flat region of the composite sheet 50 that lies between them, in front of and either side of the driver's seating area 34. This is an important area, since in a frontal collision (i.e. that likely to involve the highest energy) the force of the impact will need to be dissipated by the chassis from the impact point at the frontal region of the chassis towards the rear in a balanced manner. Likewise, in an offset collision it is important that the impact forces are distributed over the whole of the chassis and not concentrated in one small area. Such dissipation of forces reduces the deformation of the chassis around the impact point, which is especially important in small vehicles since there is generally little distance between the impact point on the exterior of the car and the passengers within.

To assist with the necessary dissipation, the composite sheet 50 includes sections composed of unidirectional fibres. These are substantially stronger than random-oriented composites, in the direction in which the fibres extend. In other directions, they may be less strong. As shown in FIG. 17, the sheet 50 comprises two such sections 78, 80, each of which extends obliquely rearwardly from one side of the chassis toward another side. The fibres in each section 78, 80 are oriented obliquely rearwardly, in the same sense as their respective section as represented by dotted lines 86 and 88.

Thus, one section 78 extends obliquely rearwardly from the left-hand longitudinal member 14 to meet the right-hand longitudinal member 18 at a point that is (longitudinally speaking) to the rear of the point where it is connected to the left-hand longitudinal member 14. Likewise, section 80 extends obliquely rearwardly from the right-hand longitudinal member 18 to meet the left-hand longitudinal member 14 at a point that is (longitudinally speaking) to the rear of the point where it is connected to the right-hand longitudinal member 18. Both sections are arranged symmetrically, related by reflection along a central vertical axis of the chassis. They therefore overlap in a central region 82 beneath the driver's feet.

This arrangement permits impact (and other) forces applied to on longitudinal member (eg the left member 14) to be transmitted via the section 78 to the opposite longitudinal member 18. As the section 78 is disposed obliquely, the forces are transmitted along it mainly in compression rather than in shear, as indicated by arrows 84, thereby taking best advantage of the composite material properties. The same obviously applies mutatis mutandis to forces applied to the right-hand longitudinal member 18.

The remainder of the composite sheet 50 includes randomly-oriented fibres within the matrix material.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. A chassis for a vehicle, comprising a framework, the framework comprising interconnected circular cross-section tubular sections including four longitudinal members, an upper and a lower longitudinal member on both a left hand and a right hand side of the vehicle and at least one composite sheet bonded to the framework to provide an internal structure to the vehicle and having a flat region laying in front of and on either side of the driver's seating area and beneath the driver's feet, at least two sections of the flat region of the composite sheet being of unidirectional fibres, the unidirectional fibres extending obliquely rearwardly, the fibers in one section extending from one side of the chassis to another side of the chassis between the lower left hand longitudinal member and the lower right hand longitudinal member, and the fibres in a second section extending from the another side of the chassis to the one side of the chassis between the lower right hand longitudinal member and the lower left hand longitudinal member, the sections being bonded to the lower left and right hand longitudinal members.

2. The chassis according to claim 1 in which the tubular sections are hollow.

3. The chassis according to claim 1 in which the sheet is non-flat.

4. The chassis according to claim 1 in which the sheet has a concave geometry.

5. The chassis according to claim 4 in which the sheet comprises a tub.

6. The chassis according to claim 1 in which the sheet is composed of a plurality of sections.

7. The chassis according to claim 6 in which the sections are joined by a method allowing a positional tolerance.

8. The chassis according to claim 1 in which the sections of the flat region of the composite sheet which are of unidirectional fibres extends obliquely rearwardly from one side of the chassis to another side in the same sense as the unidirectional fibres in the respective section are oriented.

9. The chassis according to claim 1 in which the part and the further part overlap.

10. The chassis according to claim 1 in which the part and the further part are arranged symmetrically relative to a central axis of the chassis.

11. The chassis according to claim 1 in which the two sections are located in substantially mirror-image locations relative to the central axis of the chassis.

12. The chassis according to claim 1 further comprising an engine mounted thereon.

13. The chassis according to claim 12 in which the engine is mounted on an underside of the chassis.

14. The vehicle comprising a chassis according to claim 1.

15. The chassis according to claim 1 in which the framework further comprises box-section tubular members.

* * * * *